Feb. 25, 1964   H. LEIBACH ETAL   3,122,343
VERTICAL TAKE-OFF AND LANDING AIRCRAFT
Filed Nov. 20, 1962   3 Sheets-Sheet 1
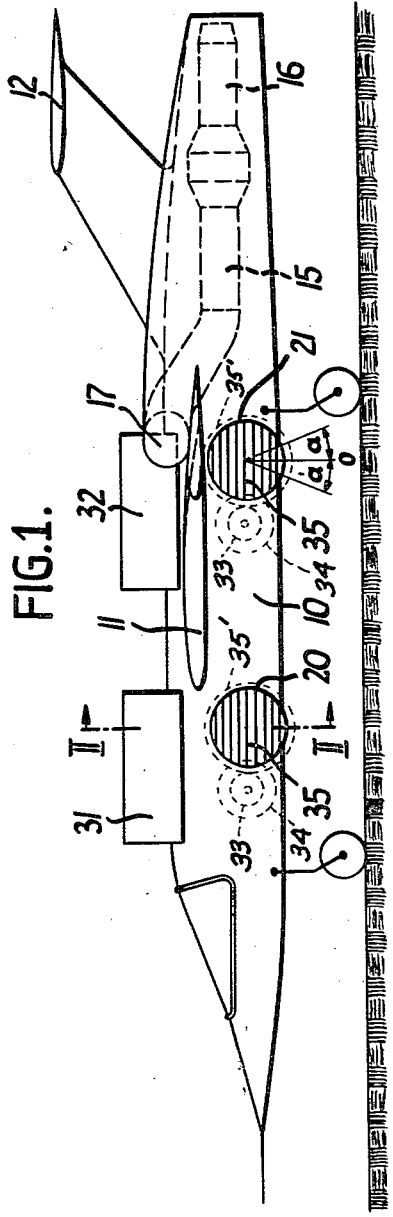
INVENTORS
HEINRICH LEIBACH &
FRITZ RIEMERSCHMID
By Greer Marechal Jr
ATTORNEY

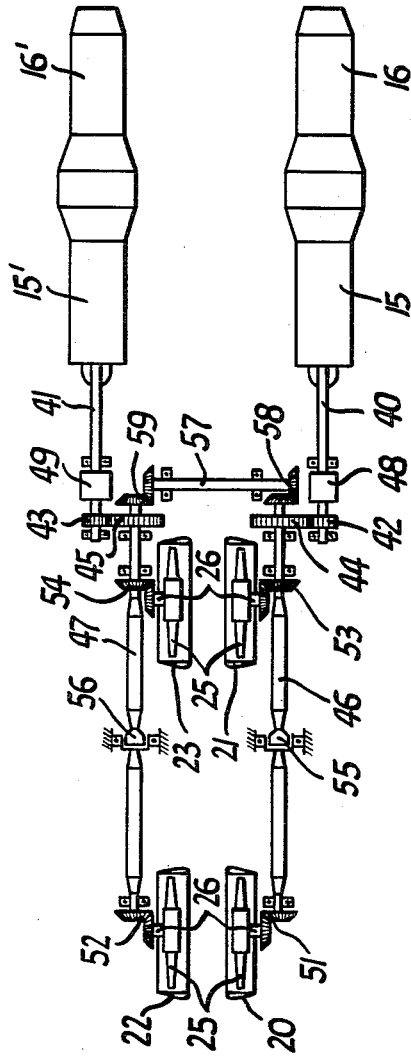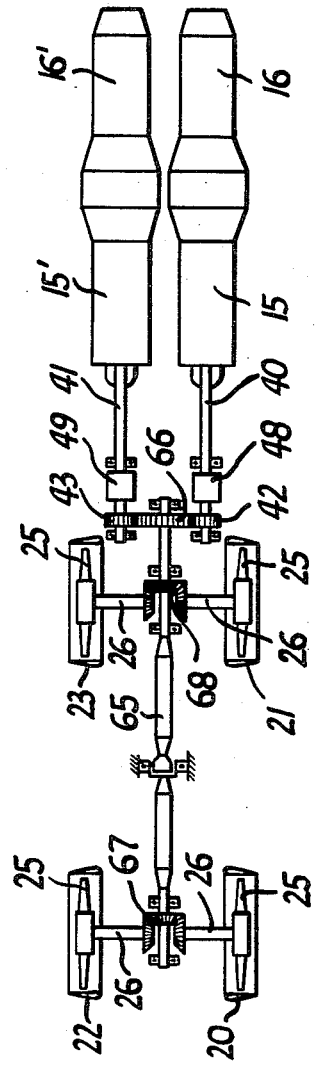

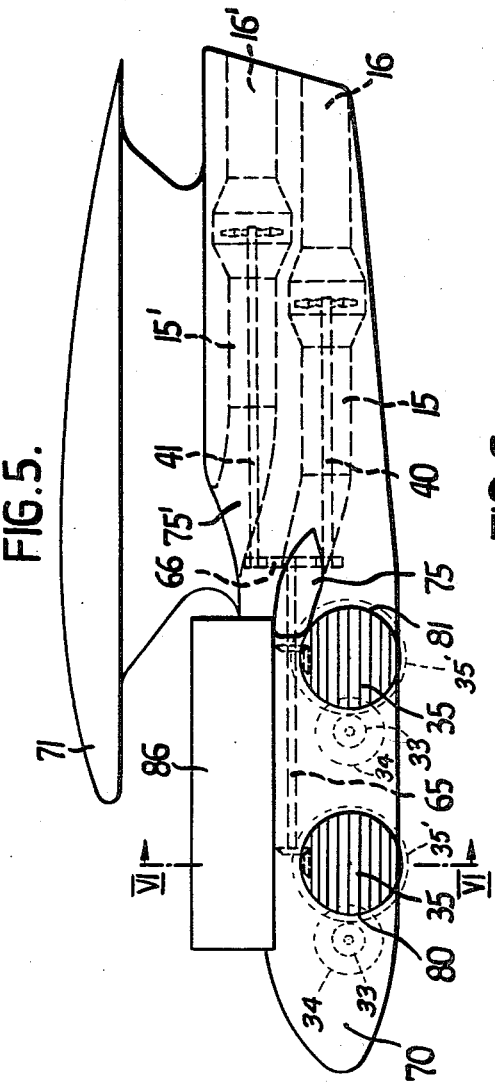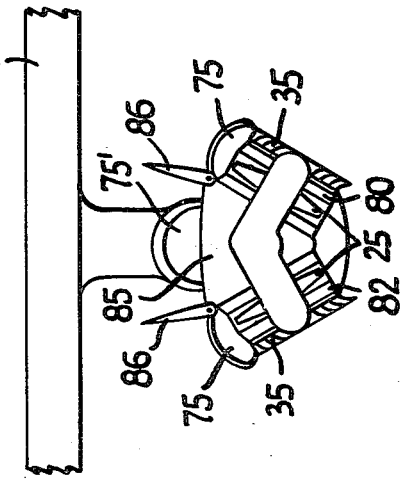

United States Patent Office 3,122,343
Patented Feb. 25, 1964

3,122,343
VERTICAL TAKE-OFF AND LANDING AIRCRAFT
Heinrich Leibach, Munich, and Fritz Riemerschmid,
Starnberg, Germany, assignors to M.A.N.-Turbo-
motoren G.m.b.H., Munich, Germany, a corporation of
Germany
Filed Nov. 20, 1962, Ser. No. 239,097
Claims priority, application Germany Dec. 2, 1961
15 Claims. (Cl. 244—23)

This invention relates to so-called vertical take-off and landing aircraft having a ducted fan lift engine for providing a vertical component of force to lift the aircraft or cushion its landing and additional propulsion means for producing horizontal components of force propelling the aircraft in horizontal flight, and, more particularly, to power plant arrangements for such aircraft including gas turbo-jet engines for producing power for both vertical and horizontal movement and driving the ducted fan lift engines, which are provided with arrangements for shifting the lift engine thrust from vertical to horizontal directions.

As will be understood, so-called vertical take-off and landing airplanes of the character to which this invention relates are intended to fly horizontally with conventional airfoil lifting surfaces, but are additionally provided with vertical thrust or lift components such as ducted fans for lifting the airplane more or less vertically and for cushioning more or less vertical descent thereof so as to provide for landings and take-offs requiring much less space than if merely conventional airfoil surfaces and forward horizontal speed were relied on to lift the airplane into flight. In such aircraft, the take-offs and the landings are to be accomplished with the aircraft in generally its normal and horizontal flying attitude, and the practicalities of such arrangements demand that the power plants be so arranged that at least a substantial portion of the vertical lift thrust also be available to product a horizontal thrust for normal horizontal flight while the aircraft is airborne.

In situations where the vertical thrust is provided by a downwardly directed ducted fan arranged in the airplane fuselage, substantial difficulties may be encountered in attempting to utilize the thrust output of such fan in a horizontal direction, upon transition from vertical flight to horizontal flight or vice versa, and especially in view of the large diameter effectively required for such ducted fan lift engines in the first place. Additionally, the size of fans required to produce sufficient lift is usually so great that locating the fans in the floor of the fuselage, for example, may result in a situation where a very substantial portion of the available pay load space in the fuselage is occupied merely by the vertical ducted fan and their appertaining apparatus.

If it is attempted to arrange such vertical ducted fans on swingable outriggers extending from the fuselage and/or in a manner where, by swinging the outriggers, the axial thrust output of the fans can be changed from a vertical to a horizontal direction, further substantial difficulties may be encountered both with regard to the greater installation space and substantially increased drag coefficient of the fuselage attributable to the outriggers, and regarding the additional complexity of an efficient mechanical drive for the fans which will also accommodate the swinging of the outriggers from vertical to horizontal position, etc.

In attempting to avoid the above noted disadvantages while retaining the desired advantages of such arrangements, it is also desirable to create the largest feasible air passage without building up or increasing the size of the fuselage or the wings of the aircraft. Similarly, it is desired that the ducted fan lift engines and appertaining drive and power plant arrangements therefor be located at points in or on the aircraft where they do not interfere with the appropriate arrangement of fuel tanks, pay loads, and the like, while a further limiting factor must be recognized in that the provision of vertical take-off and landing components should not unduly interfere with or alter the particular shape of the fuselage, wings, and tail assembly as may be required for the particular horizontal flight properties and characteristics desired.

According to this invention, then, there is provided for the arrangement of ducted fans rigidly installed in either the aircraft fuselage or in separate nacelles, with the axes of the fans disposed at oblique angles to the vertical plane of the aircraft, and in a manner which utilizes a minimum of enclosed aircraft space. Air inlets into the ducted fans are arranged between these fans installed on either side of the fuselage or nacelles and in a manner which does not interfere with the necessary air intakes for whatever main power plant is provided, in this case a turbo-jet power plant being preferred. Additionally, the thrust outlet for the fan throughput is equipped with a deflection grid adjustable or rotatable so as to vary the directional component of fan throughput thrust from a vertical direction to a horizontal direction (either forwardly or rearwardly of the horizontal flight direction of the aircraft), and with the vertical lift fans being driven by a mechanical drive from a remotely positioned turbo-jet main power plant which may also produce the entire horizontal propulsion thrust, as well as whatever portion of the total power may be utilized or desired for vertical lift.

With the foregoing and additional objects in view, this invention will now be explained in more detail, and further objects and advantages thereof will be apparent from the following description, the accompanying drawings, and the appended claims.

In the drawings:

FIG. 1 is a somewhat diagrammatic side elevation view of a jet airplane embodying and for practicing this invention;

FIG. 2 is a transverse vertical section through the arrangement of FIG. 1 along the line II—II thereof and on a somewhat larger scale;

FIG. 3 is a somewhat diagrammatic top elevation view indicating particularly the power plant and mechanical drive arrangements embodying and for practicing this invention;

FIG. 4 is a view similar to FIG. 3 but showing four ducted fan lift engines driven from a single power transmission shaft;

FIG. 5 is a somewhat diagrammatic side elevation, generally similar to FIG. 1, and showing a power plant arrangement embodying and for practicing this invention disposed in a separate nacelle, instead of in the main fuselage;

FIG. 6 is a transverse vertical section of the arrangement of FIG. 5 and taken along the line IV—IV thereof; and FIG. 7 is a somewhat diagrammatic axial section through a turbo-jet engine construction for use in accordance with this invention to produce both horizontal flying thrust and driving power for the ducted fan lift engines.

Referring to the drawings, in which like reference characters indicate like parts throughout the several views thereof, there is illustrated somewhat diagrammatically in FIGS. 1 and 2 an airplane including a power plant and appertaining ducted fan lift engines and other apparatus embodying and for practicing this invention. The main fuselage of the airplane is indicated generally by the numeral 10, and conventional airfoil wings 11 and vertical and horizontal tail assembly 12 are shown. In the tail section of fuselage 10 are installed two turbo-jet power plants, in parallel side by side, and shown as including gas turbine engines 15 and jet thrust exhaust nozzles 16 and air intakes 17 for the engines—such main power plants being described in detail below in connection with the showings of FIG. 7.

In the illustrated embodiment, two ducted fans are shown as installed in each opposite side of the fuselage 10, such fans being indicated generally by the numerals 20-23. As indicated, each such fan includes, as conventionally understood, a bladed rotor 25 mounted for rotation on a shaft 26 and driven mechanically by an arrangement such as is shown in FIGS. 3 or 4 and described in more detail below. Fans 21—22 (and 23 not shown in FIGS. 1 and 2) are installed in fixed position in the opposite side walls of fuselage 10 and disposed therein with the respective rotor axes r—r thereof downwardly inclined at an acute angle with respect to the vertical longitudinal plane y—y of the aircraft fuselage 10.

Between each oppositely disposed pair of fans 20, 22 and 21, 23 is provided an air inlet (indicated at 30 for the forward pair of fans 20, 22 and not shown for the rearward fans 21, 23), which inlet is preferably arranged as emerging from the fuselage 10 at the top thereof with the opening being controlled or closed by flaps 31 (for the forward inlet) and 32 (for rear inlet for fans 21, 23). At the outlet side of each of the lift fans 20-23 is provided a deflecting grid 35 having a plurality of axially curved deflecting blades or louvres for deflecting the originally axially directed throughput of each of the fans 20-23 into a thrust component in a direction almost perpendicular to the rotor axes r—r. Each of the deflecting grids 35 and all the louvres thereof are rotatable around the rotor axes r—r, at least to an extent whereby the direction to which the grids 35 deflect the throughput of the fans is at least 30° from the vertical (as indicated by the angles a in the diagram of FIG. 1) and, preferably, both in and opposed to the horizontal direction of flight of the airplane 37 indicates a grid of guide vanes of the ducted fans 20-23.

As will be understood, the rotation of the grids 35 about the rotor axes r—r is achieved by conventional and well understood control mechanism, it being understood that such rotation of grids 35 is accomplished in flight and along with the transition between vertical to horizontal directing or deflecting of the thrust of fans 20-23. In the illustrated embodiment, since deflecting grids 35 can be rotated about the axes r—r of the fan rotors to alter the direction of throughput of the fans 20-23 from being directed vertically downward to being directed either in or opposite to a direction of horizontal flight, such fan output is available as either propulsion or braking power during horizontal flight as may be desired, and utilizing substantially the same large components of thrust force which are available from the lift fans 20-23 during vertical take-offs or landings. For example, as indicated in FIGS. 1 and 5, deflecting grids 35 are provided with a toothed gear rim 35' with which are engaged pinions 33 which can be locked in any angular position thereof by known means (not shown) and which are driven by adjusting motors 34 (which may be of electric, hydraulic or pneumatic type).

As noted in FIGS. 1 and 2, air inlets 17 for the main gas turbine engine power plants 15 are preferably arranged laterally beyond and vertically below the air inlets 30, etc., for ducted fans 20-23 and control flaps 31 and 32 therefor. In this manner, there is obtained an undistributed flow of air to the fan inlets and, separately, to the turbo-jet intakes 17, so that the main jet engines and the various fans do not rob air from each other. Particularly in instances of hovering flight, such factors may be quite important since an absence of horizontal forward motion of the aircraft might influence the air inlets through flaps 32 to the rearward blowers 21, 23 to operate under less favorable conditions of air introduction, as might also occur with the jet engine air intake 17. In any event, the various air inlets for the blowers and the main jet engines are preferably arranged to avoid any interference with each other which, particularly upon transition between the vertical and horizontal flight, might cause disadvantageous surging of the compressors and/or other undesired disturbances of uniform and adequately freely available air in-flow for both the vertical thrust producing fans and the combustion chambers for the main propulsion engines.

As indicated in FIGS. 3 and 4, it is preferred in accordance herewith to have ducted lift fans 20-23 driven by a mechanical power transmission system from remotely positioned engines 15, especially to take sole advantage of the most efficient or desirable disposition of fans 20-23 and engines 15 with respect to the optimum performance of the several various tasks such elements are required to perform. Thus, in the arrangement of FIG. 3, a power plant and a power transmission of arrangement is diagrammed as including two turbo-jet engines 15 and 15', each having conventional jet thrust exhaust nozzles 16 and 16' for producing, in conventional manner, a horizontal forward jet thrust for propulsion of the airplane in horizontal flight. As set forth in more detail below in connection with the description of FIG. 7, each of the turbo-jet engines 15 and 15' additionally has a mechanical drive power take-off as indicated by drive shafts 40 and 41 in FIG. 3, each of which drive shafts 40 and 41 leads to driving pinions 42 and 43, which drive, respectively, gears 44 and 45 on power transmission shafts 46 and 47, with conventional free wheeling devices 48 and 49 being interposed in the power train so as to disconnect, in well known manner, either one of power shafts 40 or 41 in circumstances when it operates more slowly than other, as for example, in the instance of a failure of one or the other of the turbo-jet engines 15 or 15'.

Transmission shafts 46 and 47, driven by gears 44 and 45, transmit the power of engines 15 and 15' directly to the fans 20-23 as by bevel gear angular drives indicated generally by the numerals 51-54 operative on the respective fan shafts 26 to rotate the respective fan rotors 25, all in known and well undertsood manner. If desired, and in instances when the length of the power transmission shaft 46 and 47 and/or vibration or other considerations so indicate, shafts 46 and 47 are satisfactorily supported at intermediate points therealong (as indicated by 55 and 56) and, preferably, with the use of elastic drive connections and/or swingable supports for suspending the mechanism within fuselage 10. Preferably, in order to assure complete synchronism of all the several lift fans 20-23, the operation of power transmission shafts 46 and 47 is synchronized as by synchronizing shaft 57 and bevel gearings 58 and 59. In this manner, should one of the main engines 15 or 15' fail, the various lift fans 20-23 can all be driven by the other main engine.

If desired and/or if space considerations within fuselage 10 require or permit, the various rotors 25 and shafts 26 thereof in each of the lift fans 20-23 can all satisfactorily be driven from a single power transmission shaft 65 as indicated in the diagram of FIG. 4. In this instance, engines 15 and 15' are more closely spaced, and the drive shafts 40 and 41 therefrom drive pinions 42 and 43, through free wheeling arrangements 48 and 49, both to drive gear 66 and power shaft 65. All four rotor shafts 26 of fans 20–23 are driven, as by bevel gear drives indicated at 67 and 68, from shaft 65. As will be apparent, the gearing of both drive pinions 42 and 43 to the single driven power gear 66 automatically provides the synchronizing function achieved in FIG. 3 with shaft 57, and, in association with free wheeling devices 48 and 49 which disengages drive shaft 40 or 41 in any instance where either shaft is going more slowly than the other.

Whereas the foregoing arrangements are illustrated as being mounted within the main fuselage 10 of the airplane, an arrangement of such a power plant embodying for practicing this invention is also satisfactorily mounted in a separate power nacelle, as indicated in FIGS. 5 and 6, showing somewhat diagrammatically a power nacelle 70 suspended in known manner beneath one of the airfoil wings 71 of the aircraft. In nacelle 70, the two main turbo-jet engines 15 and 15' are illustrated as being mounted parallelly one above the other and as having the conventional jet thrust nozzles 16 and 16', and air inlets 75 and 75'. In this arrangement, four ducted lift fans 80–83 (the fourth not being shown) are arranged on opposite sides of nacelle 70 and at an angle to the vertical plane thereof, in much the same way that fans 20–23 are arranged in the main fuselage 10 of the embodiment illustrated in FIGS. 1 and 2. Each of fans 80–83 includes a rotor 25 and a rotatable deflecting grid arrangement 35, adjustably rotated by mechanism on the fan including adjusting motors 34, pinions 33 and gear rims 35', in the same manner as previously described and for accomplishing the same functions. An air inlet 85 is provided in the central and top portion of nacelle 70 and closed by flaps 86, and preferably positioned or oriented on nacelle 70 with respect to air inlet 75 and 75' for main engines 15 and 15' so as to avoid interference with in-flow of air into any of the air inlets, for the reasons and in the manner above described with regard to FIGS. 1 and 2.

Drive shafts 40 and 41 are indicated somewhat schematically for in each of the engines 15 and 15', and for synchronously driving, through gearing indicated at 66, a power transmission shaft 65 from which all four of the lift fans 80–83, etc., are driven in a manner as previously explained and, for example, with an arrangement as depicted in FIG. 4 except that the two main engines and their drive shafts are disposed one above the other instead of side by side, to achieve nevertheless the desired functioning as previously explained.

As will be apparent from the foregoing, satisfactory results in accordance herewith are achieved with a wide variety of different designs for the main engines 15, although a particularly preferred engine construction here, including both turbo-jet horizontal thrust propoulsion and the separate power take-offs for driving the lift fans, is illustrated in FIG. 7 as being generally of the character of engine described and represented in German Patent No. 1,119,675, FIGS. 1 and 2. Thus, the illustrated engine includes a housing 90 in the inlet end and into which air is introduced through inlet 91 in the forward end of the housing and connected to the various air inlets 17, 75, or 75', depending upon the disposition of the engine within the aircraft. Also in casing 90 is an air compressor comprising blades 92 and rotor portions 93, mounted on a hollow shaft 94 on the rear end of which is mounted compressor drive turbine 95 in conventional manner. Thus, as well understood, air entering air inlet 91 or casing 90 is compressed by compressor blades 92 and fed into combustion chambers 96 in which fuel is burned to provide hot drive gases exiting from combustion chambers 96 and to impinge upon turbine 95 in driving reaction. Rotation of turbine 95 by the hot combustion gases drives compressor blades 92, all in known manner as with conventional turbo-jet engines, and the hot combustion gases eventually are exhausted through jet exhaust nozzle 16 providing the thrust for horizontal propulsion of the aircraft.

For driving the lift fans 20–23 or 80–82, an additional turbine 100 is mounted in the engine to the rear of turbine 95, and is carried on a drive shaft 40 which passes coaxially through hollow shaft 94 and out the forward end of the engine 15 to the mechanical lift fan drives as indicated in FIGS. 3 and 4. This fan drive or power take-off turbine 100 is driven by impingement of hot gases from combustion chambers 96 after passing through compressor drive turbine 95 and prior to exhausting the gases through the exhaust nozzle 16. For example, an annular passage 101 conducts such hot combustion gases from turbine 95 into driving impingement with the blades of fan drive turbine 100. Preferably, fan drive turbine 100 is surrounded by an annular channel 102, and flap valves 103 and 104 are provided, under the control, respectively, of servomotors 105 and 106, by means of which the flow of gases from turbine 95 can be directed to impinge on turbine 100 (with the flaps valves 103 and 104 in the positions as shown in full line in FIG. 7) or, selectively and alternatively, to flow toward exhaust outlet 16 through annnular passages 102 completely around and outside of turbine 100 (when flap valves 103 and 104 are moved to the dotted line position shown in FIG. 7 by means of servomotors 105 and 106). The partition 107 behind turbine 100 has a folded structure, thereby building a ring of chambers, which alternately are connected either with the outlet of turbine 100 and annular passage 102 on one hand or directly with exhaust 16 on the other hand.

As will be apparent from the foregoing, there are provided in accordance herewith arrangements and constructions of main power plants and vertical lift fans whereby the fans are arranged efficiently in the aircraft fuselage or nacelles and rigidly mounted to accommodate simplified mechanical power transmission drives from remotely positioned main engines, and yet in a manner permitting deflecting the lift fan thrust from a vertical direction component to a direction contributing to the horizontal flight of the airplane. Furthermore, main engine structures are disclosed for providing a separate and separately controllable mechanical drive for the lift fans from the main turbo-jet engine and in a manner to utilize or direct a substantial portion of the power output of the engines specifically to the lift fans or, selectively, to bypass the lift fan drive and direct substantially the entire power output and thrust of the turbo-jet to horizontal propulsion.

Furthermore, the utilization of adjustable or movable deflecting grids at the fan outlets permit substantial simplification of the overall arrangement (no matter how large or how numerous the fans may be), specially with respect to eliminating the need for mechanism to move or shift the entire fan upon transition between vertical and horizontal flight. A concomitant advantage of this invention is also apparent from the arrangement of stationary fans and drive means readily to accommodate the positioning of the main power plant remotely from the fans and in a manner permitting the disposition of the main engines wherever the particular aircraft design indicated as best, and not dictated by where the ducted lift fans themselves should be positioned. Yet the arrangements in accordance herewith still enable the utilization of the main engines to provide selectively or simultaneously, the entire propulsive force for both horizontal and vertical flight and in a manner readily to effect a smooth and efficient power transition for one to the other.

While the particular forms and arrangements of apparatus herein described constitute preferred embodiments of this invention, this invention is not limited to these precise forms of apparatus, and changes may be

What is claimed is:

1. In vertical take-off and landing aircraft of the character described adapted for both substantially vertical and horizontal airborne flight and having a plurality of ducted fan lift engines mounted therein for producing a vertical thrust and lift component, the combination which comprises means for driving said fans to produce a thrust component by blowing air outwardly from said aircraft, means for mounting said fans in enclosed portions of said aircraft and disposed in opposite side walls thereof and with the axes of said fans being downwardly inclined at an acute angle with respect to a vertical plane extending longitudinally through said aircraft, an air inlet above said fans and disposed substantially between oppositely adjacent ones thereof effecting direct air flow communication from top surfaces of said aircraft to the inlet sides of said fans, closure means for said air intakes, deflecting grid and louvre means across the outlet sides of said fans for deflecting said thrust components therefrom to a substantial angle away from the axes thereof, means for mounting said deflecting grid and louvre means moveably with respect to said fans for directing said deflected thrust components therefrom selectively in a vertically downward direction or in any of a plurality of more horizontal directions, and means for adjusting and controlling said movement of said deflecting grid and louvre means during operation of said fans and while said aircraft is in flight for translating said thrust component of said fans from said vertically downward thrust component selectively to said horizontal thrust components and vice versa.

2. In vertical take-off and landing aircraft of the character described adapted for both substantially vertical and horizontal airborne flight and having a plurality of ducted fan lift engines mounted therein for producing a vertical thrust and lift component, the combination which comprises a main power plant for said aircraft, means for driving said fans from said main power plant to produce a thrust component by blowing air outwardly from said aircraft, means for mounting said fans in enclosed fuselage portions of said aircraft and disposed in opposite side walls thereof remote from said main power plant and with the axes of said fans being downwardly and outwardly inclined at an acute angle with respect to a vertical plane extending longitudinally through said aircraft, an air inlet above each of said fans and disposed substantially between oppositely adjacent ones thereof effecting direct air flow communication from top surfaces of said fuselage to the inlet sides of said fans, deflecting grid and louvre means across the outlet sides of each of said fans for deflecting said thrust components therefrom to a substantial angle away from the axes of said fans, means for mounting said deflecting grid and louvre means for rotation about the axes of said fans for directing said deflected thrust components therefrom selectively in a vertically downward direction or in any of a plurality of forward and rearward more horizontal directions, and means for adjusting and controlling said rotation of said deflecting grid and louvre means during operation of said fans and while said aircraft is in flight for translating said thrust component of said fans from said vertically downward thrust component selectively to either said forward or rearward horizontal thrust components and vice versa.

3. In vertical take-off and landing aircraft of the character described adapted for both substantially vertical and horizontal airborne flight and having a plurality of ducted fan lift engines mounted therein for producing a vertical thrust and lift component, the combination which comprises means for driving said fans to produce a thrust component by blowing air outwardly from said aircraft, means for mounting said fans in enclosed portions of said aircraft and disposed in opposite side walls thereof and with the axes of said rotary fans being downwardly and outwardly inclined at an acute angle with respect to a vertical plane extending longitudinally through said aircraft, an air inlet above said fans and disposed transversely between oppositely adjacent ones thereof effecting direct air flow communication from outside said aircraft to the inlet sides of said fans, deflecting grid and louvre means across the outlets of each of said fans for deflecting said thrust components therefrom to a substantial angle away from the axes thereof, means for mounting said deflecting grid and louvre means for rotation about the axes of said fans for directing said deflected thrust components therefrom selectively in a vertically downward direction or in any of a plurality of more horizontal directions, and means for adjusting and controlling said rotation of said deflecting grid and louvre means during operation of said fans and while said aircraft is in flight for translating said thrust component of said fans from said vertically downward thrust component selectively to said horizontal thrust components and vice versa.

4. An aircraft as recited in claim 3 which also includes a main power plant comprising a turbo-jet engine for providing power both for driving said lift fans and for propelling said aircraft in horizontal flight.

5. An aircraft as recited in claim 3 which also includes a gas turbine power plant disposed in said aircraft remote from said lift fans, and in which said means for driving said fans includes mechanical gear drive means and power transmission shafts for synchronously driving all said lift fans from said gas turbine power plant.

6. An aircraft as recited in claim 5 in which said gas turbine power plant comprises a pair of turbo-jet engines arranged in parallel, both of said engines being in driving engagement with said gear drive means and power transmission shafts to said fans.

7. An aircraft as recited in claim 6 in which free wheeling devices are inserted between said engines and said power transmission shafts for disconnecting from said power transmission shafts either of said engines whenever it is running more slowly than the other, and in which all of said fan drive means are synchronously geared together at a point in the train of power from said engines beyond said free wheeling devices effecting driving of all said fans by one of said engines upon the operation of said free wheeling device to disconnect the other of said engines.

8. An aircraft as recited in claim 4 which also includes flap closure means for said air inlet for said fans for closing the outer opening of said air inlet adjacent the outside surface of said aircraft.

9. An aircraft as recited in claim 4 in which said main power plant is provided with air intakes disposed on outside surfaces of said aircraft, and in which said air inlets for said fans and said air intakes for said power plant are disposed at different positons on said aircraft for avoiding interference and non-uniform in-flow of air thereinto.

10. An aircraft as recited in claim 3 in which all said fans are mounted in opposite side walls of the main fuselage portion thereof.

11. An aircraft as recited in claim 3 which includes a main fuselage portion and a plurality of separate power plant nacelles, disposed on opposite sides of said main fuselage, and in which said fans are disposed in said nacelles and mounted in pairs in the opposite side walls thereof, with said air inlets for said fans being disposed in the top portion of said nacelles and between each said pair of blowers therein.

12. An aircraft as recited in claim 11 in which each of said nacelles has mounted therein a gas turbine power plant for driving said fans.

13. An aircraft as recited in claim 12 in which said gas turbine power plant comprises a plurality of turbo-jet engines in each said nacelle and geared together for synchronously driving all said blowers in each said nacelle.

14. An aircraft as recited in claim 4 in which said turbo-jet engine includes an extra driving turbine for driving said fans and in addition to other parts of said engine producing said horizontal propulsion of said aircraft.

15. An aircraft as recited in claim 14 in which said turbo-jet engine includes a gas turbine for driving the compressor of said engine, and in which said extra turbine is mounted in said engine rearwardly of said gas turbine, and is connected to said means for driving said fans by a drive shaft extending forwardly and coaxially through said gas turbine said compressor and other parts thereof.

References Cited in the file of this patent

UNITED STATES PATENTS

| | | |
|---|---|---|
| 984,269 | Friedel | Feb. 14, 1911 |
| 3,065,936 | Messerschmitt | Nov. 27, 1962 |

FOREIGN PATENTS

| | | |
|---|---|---|
| 846,300 | Great Britain | Aug. 31, 1960 |
| 861,480 | Great Britain | Feb. 22, 1961 |